Feb. 1, 1966 A. M. MOEN 3,232,308
SWING SPOUT MIXING FAUCET WITH DIVERTER VALVE
Filed Oct. 10, 1962 3 Sheets-Sheet 3

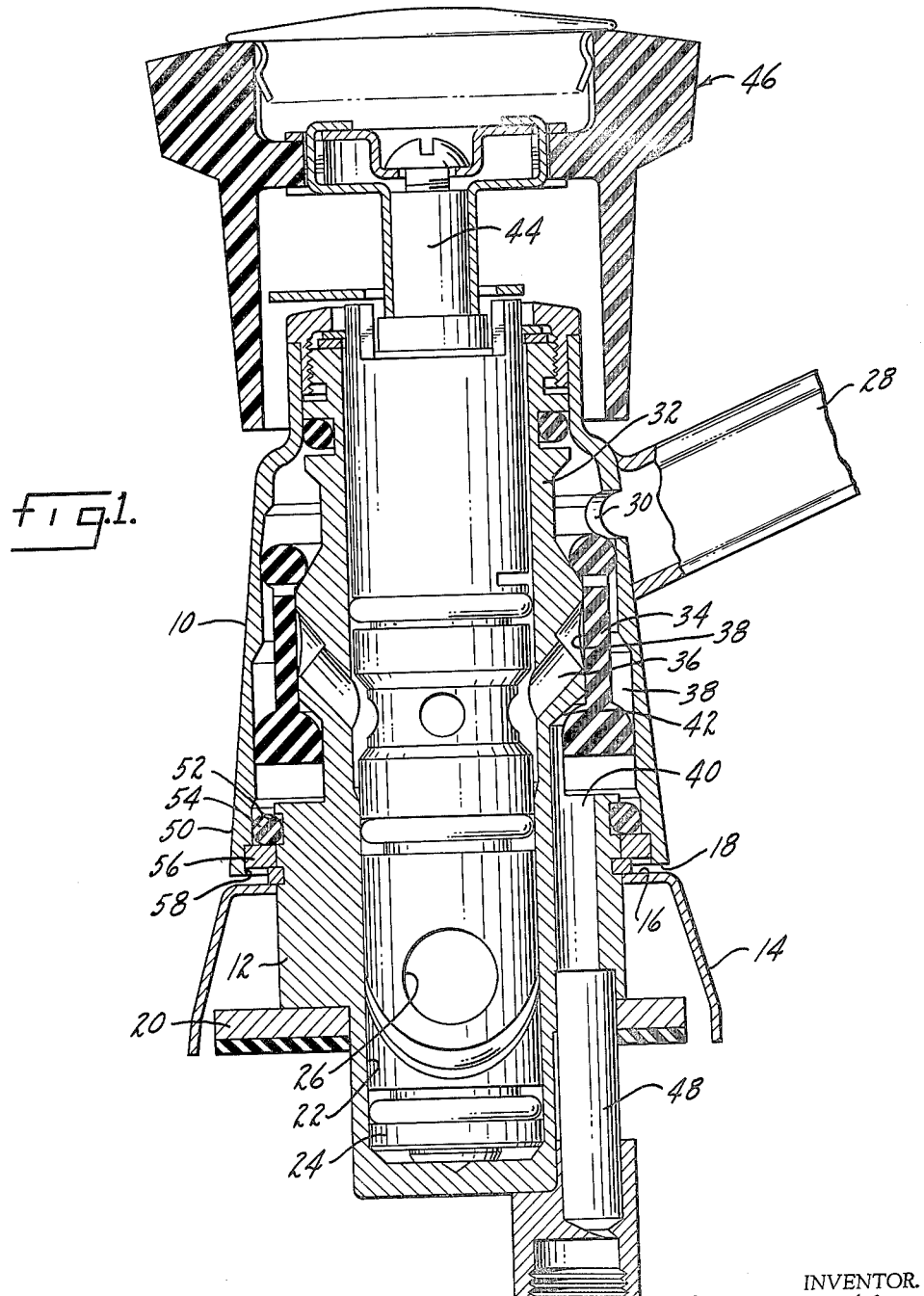

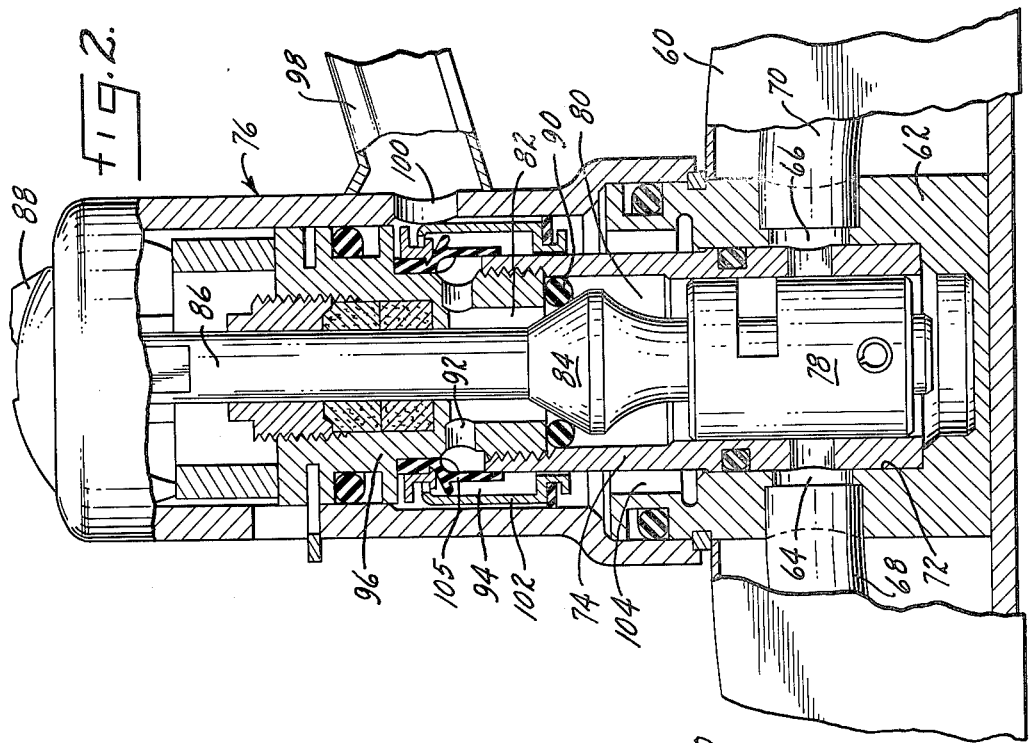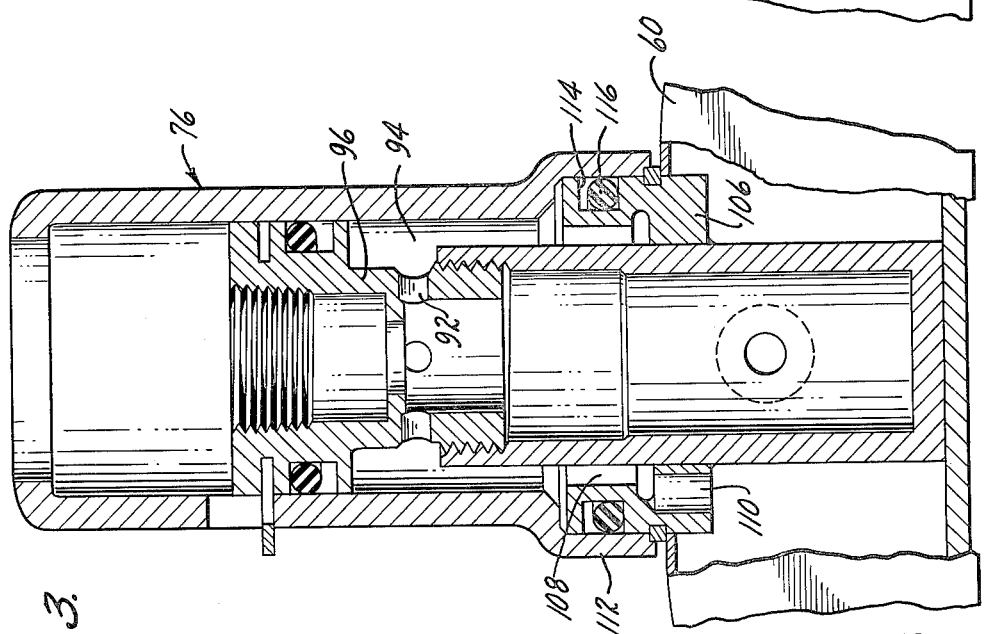

INVENTOR.
Alfred M. Moen,
BY Parker & Carter
Attorneys.

United States Patent Office 3,232,308
Patented Feb. 1, 1966

1

3,232,308
SWING SPOUT MIXING FAUCET WITH
DIVERTER VALVE
Alfred M. Moen, 25 Lakeview Drive, Grafton, Ohio
Filed Oct. 10, 1962, Ser. No. 229,570
8 Claims. (Cl. 137—119)

This invention relates to improvements in single handled mixing faucets and is a continuation-in-part of my copending applications Serial No. 744,956, now abandoned, filed June 27, 1958; Serial No. 84,811, now abandoned, filed January 25, 1961, which is a continuation of Serial No. 588,102, filed May 29, 1956, now abandoned; and Serial No. 207,893, now abandoned, filed July 6, 1962.

A primary purpose of the invention is to provide a faucet of the type described having improved means for directing water to an accessory discharge device.

Another purpose is a faucet of the type described including a generally axial bore in the base of the faucet, which bore opens into a diverter chamber.

Another purpose is a faucet of the type described having improved means for sealing the faucet housing to the base of the faucet.

Other purposes will appear in the ensuing specification, drawings and claims.

The invention is illustrated diagrammatically in the following drawings wherein:

FIGURE 1 is an axial view through a faucet housing, with parts in section,

FIGURE 2 is an axial view, similar to FIGURE 1, showing a modified form of faucet and housing, FIGURE 3 is an axial section, similar to FIGURE 2, showing a further form of faucet, with the valve stem, valve and packing parts for the valve stem removed.

Figure 4:
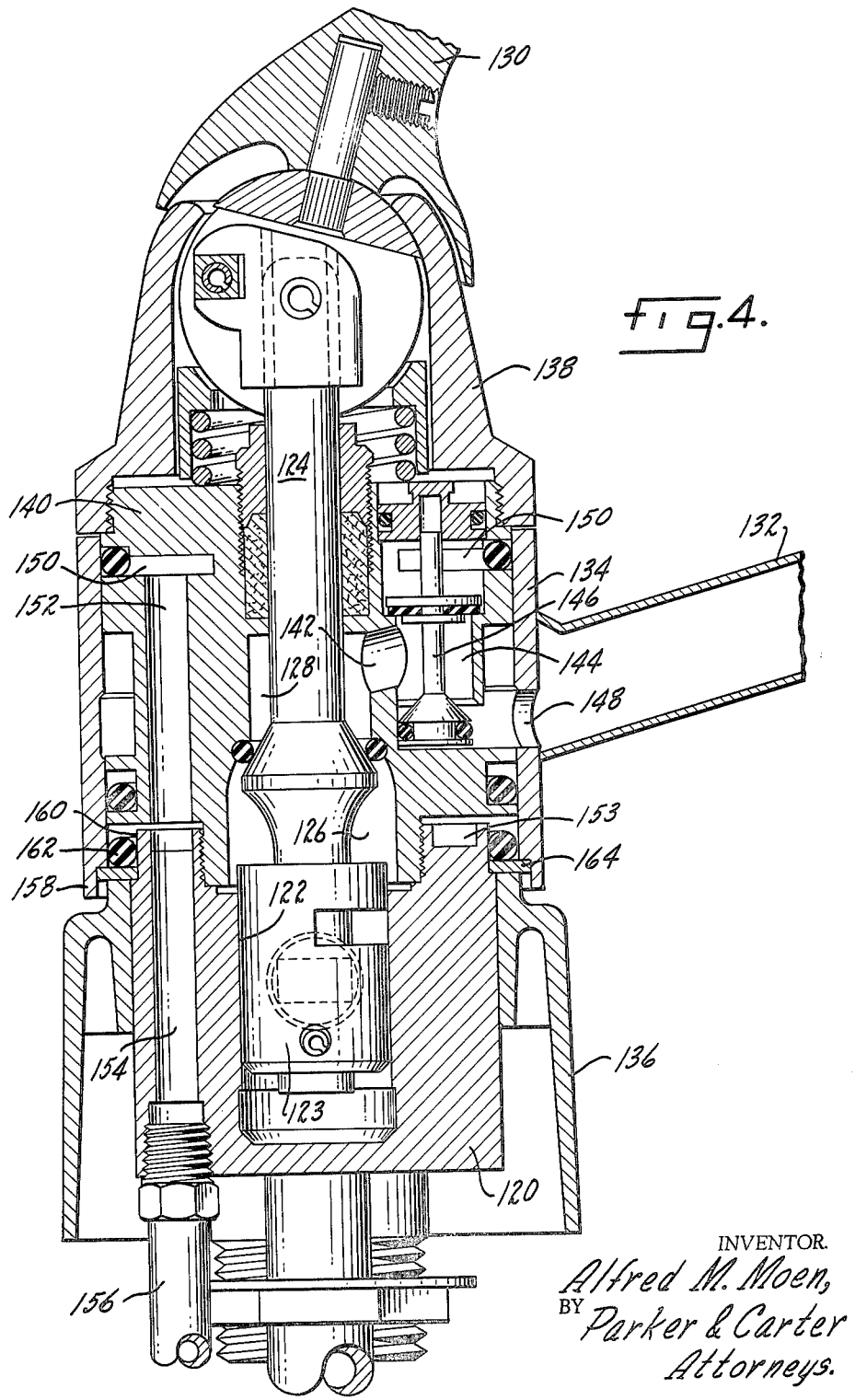
FIGURE 4 is an axial section showing yet a further form of faucet.

In FIGURE 1, a generally cylindrical slightly conical housing 10 may be mounted on a somewhat cylindrical base or base member 12. A somewhat conical cover plate 14 has an upper surface 16 which is in close proximity to the lower surface 18 of the housing 10. The base member 12 may be supported by a plate or surface 20 which may be a part of the cover plate or mounting or it may be the upper surface of the sink.

The base member 12 may have a generally central chamber 22 within which is mounted a valve cartridge 24. The valve cartridge 24 may have inlet ports 26 for hot and cold water, only one of said ports being shown. The valve cartridge 24 will not be explained in detail herein, as valve cartridges of this general type are illustrated in my co-pending application Serial No. 6,452, filed February 3, 1960, now Patent No. 3,103,231. What is important is that a valve means be positioned within the base chamber 22 which is effective to regulate the temperature and volume of water upon rotation and reciprocation of a valve stem.

A spout 28 fastened to the housing 10 may be in communication with the interior of the housing through a port 30. Mounted for up and down movement between the housing 10 and a sleeve or valve body 32, which may be integral with and an extension of the base 12, is a diverter indicated generally at 34. The operation of the diverter is generally the same as that illustrated in my co-pending application Serial No. 117,117, now abandoned, filed June 14, 1961. In the position shown, water from the valve cartridge discharges through a port 36 into the diverter chamber 38 and then downwardly through a bore 40 to an auxiliary device, such as a spray

2 or the like. The upper portion of the diverter seals the outlet to the spout. In normal operation, the diverter will raise up until the lower ring contacts a tapered portion 42 of the valve body and seals the entrance to passage 40. Water will then be directed to the spout 28.

I may provide a valve stem 44 at the upper end of the valve cartridge 24 with the stem extending upwardly into a cap or dial indicated generally at 46. The cap arrangement will not be described in detail as an understanding of it is not essential to the invention. In any event, the cap may be both rotated and reciprocated which both rotates and reciprocates the valve stem and the valve cartridge 24 to thereby regulate the volume and temperature of the water discharged through the spout or through the accessory discharge passage.

Of particular importance in this invention is the placement of the passage 40 and the sealing means therefor. It is desirable to mask or otherwise hide the entrance of the accessory discharge outlet into the diverter chamber or into the faucet housing proper. In prior assemblies of this type the diverter or accessory discharge passage came into the housing at a visible point. The present invention provides a bore 40 within the base 12, the bore or passage extending upwardly into the diverter chamber 38. The bottom of the bore or passage 40 may open into a fitting 48 to which the conventional hose for an auxiliary spray device may be attached.

When using this type of arrangement for connecting the spray device into the diverter chamber there is a problem with sealing the housing. This particular problem has been solved by extending the lower edge or lip of the housing, indicated at 50, downwardly beyond the upper end of the base member 12. An annular groove 52 may be formed adjacent the upper end of the base member and an O-ring or some other suitable type of seal ring 54 may be positioned in this groove. The outer periphery of the seal ring 54 is in continuous contact with the lower lip 50 of the housing and there is a firm seal at this point. In order to further position and support the O-ring 54 an annular ring 56 may be positioned just below the O-ring 54 and in firm contact with the outside of the base 12 and the inside of the lower lip 50 of the housing. A small annular groove 58 may be formed at the inside of the lip 50 to accommodate the ring 56.

FIGURES 2 and 3 illustrate modified forms of faucet housings incorporating the same principles as illustrated in FIGURE 1. In FIGURE 2, a mounting or cover plate 60 may centrally position a base member 62 having hot and cold water inlet ports 64 and 66. Suitable hoses or the like 68 and 70 are positioned in the ports 64 and 66 and are in communication with a generally central chamber 72 formed in the base member 62. A sleeve 74 may be positioned in the chamber 72 and may rise upwardly into the housing indicated generally at 76. Positioned within the chamber 72 is a mixing valve 78, details of which are not important to this invention. The mixing valve is effective to mix the hot and cold water coming through ports 64 and 66 and to send a regulated volume of water upwardly into a chamber 80. From chamber 80 the water passes by valve 84 into an upper chamber 82. Valve member 84 has a stem 86 at its upper end which extends to the top of housing 76. Mounted on top of the housing 76 and connected to the stem 86 is a suitable manual control 88 which is effective to rotate and reciprocate the stem 86, valve 84 and the valve means 78. A suitable O-ring or the like 90 may be used to seal the upper end of chamber 80.

From chamber 82 water may flow outwardly through ports 92 into a generally annular diverter chamber 94 which is defined by the inside of the housing 76 and the outside of the upwardly rising sleeve 74 and the outside of sleeve 96. The above-described details are not important to an understanding of the invention and are only briefly covered.

A spout 98 may be fastened to the housing 76 and may be in communication with the diverter chamber 94 through a port 100. Within the diverter chamber 94 is a diverter mechanism of the type described in U.S. Patent 2,998,824. There is a cage 102 which is movable within the diverter chamber and is effective to direct water either through port 100 into the spout 98 or downwardly into an annular chamber 104 and then downwardly through a passage in the base member 62 to an auxiliary spray device. A flexible check valve 105 may be positioned to control water from port 92 and to perform an antisiphon function.

FIGURE 3 illustrates a device substantially similar to that shown in FIGURE 2 with a small modification. The same numbers have been given to like parts in FIGURES 2 and 3. The base member as shown in FIGURE 3 is indicated at 106 and is substantially smaller than the base member in FIGURE 2. An annular chamber 108 is formed within the base member and receives water from the diverter chamber and directs it through a downwardly extending passage or bore 110 in the base member. A suitable hose or the like may be attached to the passage or bore 110 to direct water to the auxiliary spray device.

In both FIGURES 2 and 3 the housing 76 has an outwardly and downwardly flared lip 112 which masks and overlies the upper end of the base member. An annular groove 114 may be formed at the upper end of the base member and a suitable O-ring or the like 116 may be placed in this groove. The O-ring is in peripheral contact with the flared lip 112 and so provides a firm seal at the bottom end of the housing.

FIGURE 4 illustrates yet a further form of faucet arrangement which can include a passage and sealing arrangement of the type described. I have a base member 120 which has a generally central chamber 122 within which is mounted a valve 123 substantially similar to that shown in FIGURES 2 and 3. Hot and cold water inlet ports, not shown, will direct water to valve 123. There is a valve stem 124 which extends upwardly through chamber 126, through a second chamber 128, and is pivotally attached to a manual control 130 at its upward end. The manual control 130 is effective to both rotate and reciprocate the stem 124 and the valve 123 to vary the volume and temperature of the water discharged through spout 132.

The spout 132 is attached to a rotatable housing member 134, which, together with a somewhat conical lower housing section 136 and an upper housing section 138, forms the entire housing structure for the faucet.

The base member 120 may mount an upwardly extending sleeve or the like 140 which defines the chambers 126 and 128 and which has a port 142 which opens into a diverter chamber 144. Within the diverter chamber 144 is a piston-like diverter 146, a description of which is not necessary for an understanding of the invention. In any event, after water flows through port 142 into the diverter chamber 144, it will either pass through port 148 and into the spout 132 or it will flow upwardly into a generally annular chamber 150 and then downwardly through an axial passage or bore 152. The bore 152 opens into an annular chamber 153 which in turn is in communication with an axial bore 154. The bore or passage 154 opens into a hose or the like 156.

As was true in the other forms of the invention, the rotatable housing 134 has a downwardly extending lip 158 which forms a seal with the upper end 160 of the base member. A seal ring 162 may be suitably positioned between these two members and an annular ring 164 may support the seal ring in its sealing position.

The use, operation and function of the invention are as follows:

This invention is particularly directed to improvements in single handled mixing faucets. It is desirable to have the diverter or auxiliary spray device attached to the faucet housing in such a way that it is not visible on the outside. Not only does this provide a more pleasing appearance, but it enables the housing structures to be mass produced for both diverter and non-diverter use. It is only necessary to form a bore in the base member when it is desired to attach a diverter.

A sealing problem is developed when the diverter passage is to be formed in the base of the housing. To form a good seal for the diverter passage, the faucet housing should extend downwardly beyond the upper end of the base member to form a lip which overlies and extends beyond the upper end of the base member. A suitable seal ring may be placed between the housing lip and the upper end of the base member. It is this particular sealing arrangement as well as the downwardly extending passage through the base member which is the subject of the present invention.

The form of the housing as well as the type of faucet may vary considerably. Three different forms of faucets are illustrated and described herein. Each of these faucets is of the single handled mixing type and includes a diverter. The type of diverter may vary. What is important however is that in each case there is a generally axially extending passage from the diverter chamber down through the base member to an attachment for an auxiliary spray device. There is in addition a lower lip on the housing which extends beyond the upper end of the base member for forming a seal.

Although the invention has been generally described in connection with housings and faucets which are substantially upright, the invention should not be so limited. It is also possible to mount a housing of the type described in a horizontal position.

Whereas the preferred form of the invention has been shown and described herein, it should be realized that there are many modifications, substitutions and alterations thereto within the scope of the following claims.

I claim:

1. In a single handled mixing faucet, a base, a chamber in said base, hot and cold water inlets in said base opening into said chamber, valve means in said chamber for mixing hot and cold water, a stem rising upwardly from said valve means, and manual means for reciprocating and rotating said stem, a rotatable housing, a spout fixed to said housing, said stem rising upwardly in said housing and said manual means extending outwardly through said housing, a lip on the lower end of the housing and extending outside of and overlying the upper end of the base, a seal between the upper end of the base and said lip, means defining a diverter chamber within the housing and a port in the housing connecting the spout and said diverter chamber, passage means connecting said diverter chamber and said valve means, a reciprocal diverter in said diverter chamber, and a downwardly extending bore in said base, said bore forming a a passage between said diverter chamber and an accessory discharge device.

2. The structure of claim 1 further characterized in that said lip is outwardly flared.

3. The structure of claim 1 further characterized in that the seal between the lip and base includes an annular groove in the upper end of the base, and an annular seal ring positioned in said groove, said lip being in peripheral contact with said seal ring.

4. The structure of claim 3 further characterized by an annular ring between said lip and base, and positioned to at least partially support said seal ring.

5. The structure of claim 1 further characterized by a sleeve rising upwardly from said base, said valve means extending upwardly in said sleeve, said diverter chamber surrounding said sleeve, and a plurality of ports in said sleeve connecting said diverter chamber and said valve means.

6. The structure of claim 5 further characterized in that said sleeve is integral with said base.

7. The structure of claim 1 further characterized in that said bore is generally parallel to said valve means and stem.

8. The structure of claim 1 further characterized in that said diverter member is annular.

References Cited by the Examiner

UNITED STATES PATENTS

| 1,923,775 | 8/1933 | Crowley | 285—347 |
| 2,871,880 | 2/1959 | Leuthesser | 137—597 |
| 2,992,657 | 7/1961 | Weddendorf | 137—597 X |
| 2,998,824 | 9/1961 | Ward | 137—119 |

FOREIGN PATENTS

| 575,346 | 5/1959 | Canada. |

M. CARY NELSON, *Primary Examiner.*

WILLIAM F. O'DEA, *Examiner.*